(12) United States Patent
Köhn et al.

(10) Patent No.: US 12,452,237 B2
(45) Date of Patent: Oct. 21, 2025

(54) BIOMETRIC SYSTEM COMPRISING A CONTACTLESS SMARTCARD AND AN ENROLLMENT ASSISTANCE DEVICE, AND A METHOD FOR ENROLLING A USER HAVING THE SYSTEM

(71) Applicant: FINGERPRINT CARDS ANACATUM IP AB, Gothenburg (SE)

(72) Inventors: Tomas Köhn, Hässleholm (SE); Harald Ripa, Bjärred (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 142 days.

(21) Appl. No.: 18/550,706

(22) PCT Filed: Mar. 25, 2022

(86) PCT No.: PCT/SE2022/050292
§ 371 (c)(1),
(2) Date: Sep. 15, 2023

(87) PCT Pub. No.: WO2022/211702
PCT Pub. Date: Oct. 6, 2022

(65) Prior Publication Data
US 2024/0187408 A1    Jun. 6, 2024

(30) Foreign Application Priority Data
Mar. 30, 2021  (SE) .................................... 2150386-7

(51) Int. Cl.
G06F 21/00  (2013.01)
H02J 50/10  (2016.01)
H04L 9/40  (2022.01)

(52) U.S. Cl.
CPC .......... *H04L 63/0861* (2013.01); *H02J 50/10* (2016.02); *H04L 63/0853* (2013.01)

(58) Field of Classification Search
CPC .. H04L 63/0861; H04L 63/0853; H02J 50/10; G06K 19/0718; G06F 21/32
See application file for complete search history.

(56) References Cited

U.S. PATENT DOCUMENTS

| 12,289,599 B2 * | 4/2025 | Lee ...................... H04B 5/263 |
| 2008/0126260 A1 * | 5/2008 | Cox .................... G06Q 20/3552 |
|  |  | 705/67 |

(Continued)

FOREIGN PATENT DOCUMENTS

| WO | 2011072310 A1 | 6/2011 |
| WO | 2019154504 A1 | 8/2019 |

(Continued)

OTHER PUBLICATIONS

International Search Report and Written Opinion for International Application No. PCT/SE2022/050292, dated May 4, 2022.

(Continued)

*Primary Examiner* — Kendall Dolly
(74) *Attorney, Agent, or Firm* — Westman, Champlin & Koehler, P.A.

(57) ABSTRACT

An enrollment assistance device comprising a carrier with a first surface portion for a user device, and a second surface portion for a contactless smartcard; a first wireless power transfer arrangement supported by the carrier and arranged in the first surface portion of the carrier; a second wireless power transfer arrangement supported by the carrier and arranged in the second surface portion of the carrier; and a conductor arrangement supported by the carrier and conductively connecting the first wireless power transfer arrangement and the second wireless power transfer arrangement.

11 Claims, 5 Drawing Sheets

(56) References Cited

U.S. PATENT DOCUMENTS

| | | |
|---|---|---|
| 2010/0079253 A1 | 4/2010 | Phipps et al. |
| 2017/0170678 A1* | 6/2017 | Uhm ...................... H02J 50/70 |
| 2018/0115197 A1* | 4/2018 | Li ......................... H02J 50/80 |
| 2018/0276519 A1* | 9/2018 | Benkley, III ....... G06V 40/1306 |
| 2018/0294845 A1* | 10/2018 | Bimbaud ................ H02J 50/10 |
| 2019/0065921 A1 | 2/2019 | Benkley, III et al. |
| 2019/0179438 A1* | 6/2019 | Benkley, III ............ G06F 3/044 |
| 2020/0013032 A1* | 1/2020 | Moskowitz ........... G06Q 20/105 |
| 2020/0327533 A1 | 10/2020 | Deprun et al. |
| 2021/0374218 A1 | 12/2021 | Humborstad et al. |
| 2022/0230037 A1 | 7/2022 | Roessner et al. |

FOREIGN PATENT DOCUMENTS

| | | |
|---|---|---|
| WO | 2020002678 A1 | 1/2020 |
| WO | 2020240430 A1 | 12/2020 |

OTHER PUBLICATIONS

Extended European Search Report dated Aug. 30, 2022, for corresponding European Application No. 22164430.5, 8 pages.

* cited by examiner

BIOMETRIC SYSTEM COMPRISING A CONTACTLESS SMARTCARD AND AN ENROLLMENT ASSISTANCE DEVICE, AND A METHOD FOR ENROLLING A USER HAVING THE SYSTEM

CROSS-REFERENCE TO RELATED APPLICATION

This Application is a Section 371 National Stage Application of International Application No. PCT/SE2022/050292, filed Mar. 25, 2022, which claims priority to Swedish Patent Application No. 2150386-7 filed on Mar. 30, 2021, and published as WO 2022/211702 A1 on Oct. 6, 2022, in English, the entire contents of which are hereby incorporated by reference in their entireties.

FIELD OF THE INVENTION

The present invention relates to an enrollment assistance device, for facilitating biometric enrollment of a user of a contactless smartcard including a biometric arrangement, and to a method of enrolling the user.

BACKGROUND OF THE INVENTION

Biometric arrangements are widely used as means for increasing the convenience and security of personal electronic devices, such as mobile phones etc. Fingerprint sensing arrangements, in particular, are now included in a large proportion of all newly released personal communication devices, such as mobile phones.

Lately, efforts have also been made to introduce biometric arrangements, such as fingerprint sensing arrangements, in other devices that may have less computing power and/or available energy. Examples of such other devices are so-called smartcards, door locks, and devices in the so-called internet of things (IoT) category etc.

It is, however, challenging to provide for secure, reliable, and convenient biometric enrollment of a user of such biometric arrangements. For instance, it may be desirable to guide the user during the enrollment, which is complicated by the fact that some devices with biometric arrangements may lack a user interface, or may have only rudimentary means for interacting with the user. For example, a biometrically enabled smartcard may typically have no user interface integrated in the smartcard.

For a contactless smartcard, US 2020/0327533 proposes to power and communicate with the smartcard during enrollment using the user's mobile device. To aid the user in correctly positioning the smartcard in relation to the mobile device, US 2020/0327533 discloses that a visual marker is displayed on the screen of the mobile device to guide the user to correctly arrange the smartcard on the backside of the mobile device during the enrollment procedure.

It appears to be potentially cumbersome for the user to press the smartcard against the backside of the mobile device, while attempting to enroll one or more fingers, while at the same time following instructions and guidance provided on the display on the frontside of the mobile device.

It would therefore be desirable to provide for more user-friendly enrollment in a biometrically enabled contactless smartcard.

SUMMARY

In view of above-mentioned and other drawbacks of the prior art, it is an object of the present invention to provide for improved, in particular more user-friendly, enrollment in a biometrically enabled contactless smartcard.

According to a first aspect of the present invention, it is therefore provided an enrollment assistance device, for facilitating biometric enrollment of a user of a contactless smartcard including a biometric arrangement and a wireless power transfer arrangement, the enrollment assistance device comprising: a carrier having a first surface portion for arrangement of a user device including a wireless power transfer arrangement, and a second surface portion, spaced apart from the first surface portion, for arrangement of the contactless smartcard; a first wireless power transfer arrangement supported by the carrier and arranged to form a first wireless power transfer link with the wireless power transfer arrangement of the user device when the user device is arranged on the first surface portion of the carrier; a second wireless power transfer arrangement supported by the carrier and arranged to form a second wireless power transfer link with the wireless power transfer arrangement of the contactless smartcard when the contactless smartcard is arranged on the second surface portion of the carrier; and a conductor arrangement supported by the carrier and conductively connecting the first wireless power transfer arrangement and the second wireless power transfer arrangement, in such a way that power transfer is enabled from the user device to the contactless smartcard, via the first wireless power transfer link, the conductor arrangement, and the second wireless power transfer link.

The present invention is based upon the realization that enrollment in a biometrically enabled contactless smartcard can be improved by utilizing wireless power transfer from a user device and facilitating arrangement of the contactless smartcard in relation to the user device, so that the user is not required to actively hold the smartcard in relation to the user device during the enrollment procedure. The present inventors have further realized that this can be achieved by providing an enrollment assistance device having a carrier with a first wireless power transfer arrangement in a predetermined first portion, a second wireless power transfer arrangement in a predetermined second portion spaced apart from the first portion, and a conductor arrangement connecting the first and second wireless power transfer arrangement such that power can be transferred from the user device to the contactless smartcard via the first and second wireless power transfer arrangements and the conductor arrangement.

Hereby, the contactless smartcard and the user device can, for example, be arranged so that the user has easy access to a biometric sensor, such as a fingerprint sensor, on the smartcard during the entire enrollment procedure. In the event that the user device has a GUI (graphical user interface), the user can also be guided during the enrollment, using the GUI of the user device. This may provide for a shorter enrollment procedure, which may also result in a higher quality of the enrolled biometric template.

Furthermore, the configuration with a carrier and first and second wireless power transfer arrangements, and an interconnecting conductor arrangement supported by the carrier provides for the production of enrollment assistance devices which are relatively inexpensive and environmentally friendly, since there is no need for a battery or conventional cabling etc.

The enrollment assistance device according to embodiments of the present invention can therefore be distributed to users together with, or separately from, a contactless smartcard with a biometric arrangement, with reduced cost and environmental impact.

In embodiments, the enrollment assistance device may be provided in the form of a sheet having the first and second wireless power transfer arrangements and the interconnecting conductor arrangement provided on, or embedded in, the sheet. The sheet may at least partly be made of paper.

The enrollment assistance device may, furthermore, be included in a biometric system, further comprising a contactless smartcard including a biometric arrangement and a wireless power transfer arrangement, wherein the contactless smartcard is arranged on the second surface portion of the carrier of the enrollment assistance device.

According to a second aspect of the present invention, there is provided a method of enrolling a user having the above-mentioned biometric system, and a mobile user device including a wireless power transfer arrangement arranged to provide an electric field for power transfer adjacent to a backside of the mobile user device, and a display arranged on a frontside of the mobile user device, the method comprising the steps of: guiding the user to arrange the mobile user device on the first surface portion of the carrier of the enrollment assistance device comprised in the biometric system, with the backside of the mobile user device facing the first surface portion; transmitting, by the mobile user device to the contactless smartcard arranged on the second surface portion of the carrier, a signal encoding an instruction to the contactless smartcard to start to perform biometric enrollment; and receiving, by the mobile user device from the contactless smartcard arranged on the second surface portion of the carrier, after the biometric enrollment has been completed, a signal indicative thereof.

In various embodiments of the method according to the present invention, the carrier of the enrollment assistance device comprised in the biometric system may comprise at least one indicium for guiding the user to correctly arrange the mobile user device on the first portion of the carrier, in relation to the first wireless power transfer arrangement; and the step of guiding the user may comprise controlling the mobile user device to provide an alignment pattern on the display of the mobile user device, the alignment pattern being arranged on the display in relation to the wireless power transfer arrangement of the mobile user device and the at least one indicium on the carrier to enable the user to align the wireless power transfer arrangement of the mobile user device with the first wireless power transfer arrangement of the enrollment assistance device comprised in the biometric system, by aligning the alignment pattern on the display with the at least one indicium on the carrier.

In embodiments, the method may further comprise the steps of performing a user authentication using the mobile user device; and allowing completion of the biometric enrollment only if the user authentication is successful.

The user authentication using the mobile user device may, for example, involve inputting a password, a PIN, or an OTP to the mobile user device, or performing biometric authentication using the mobile user device. Following a successful authentication, the biometric enrollment functionality of the contactless smartcard may be unlocked by a signal provided by the mobile user device to the contactless smartcard. Such a procedure is, per se, well-known to the person skilled in the relevant art.

Alternatively, enrollment in the contactless smartcard may be performed before the above-mentioned user authentication is carried out, and the contactless smartcard may be locked or the enrolled biometric information may be erased if the subsequent user authentication fails or is not performed.

The method according to embodiments of the present invention may advantageously, at least partly, be carried out by a computer program (such as an app) that is run on the mobile user device. Such a computer program may, for example, be provided to the user by the party issuing the contactless smartcard. The contactless smartcard may, for example, be a dual interface smartcard.

In summary, the present invention thus relates to an enrollment assistance device comprising a carrier with a first surface portion for a user device, and a second surface portion for a contactless smartcard; a first wireless power transfer arrangement supported by the carrier and arranged in the first surface portion of the carrier; a second wireless power transfer arrangement supported by the carrier and arranged in the second surface portion of the carrier; and a conductor arrangement supported by the carrier and conductively connecting the first wireless power transfer arrangement and the second wireless power transfer arrangement.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1A:
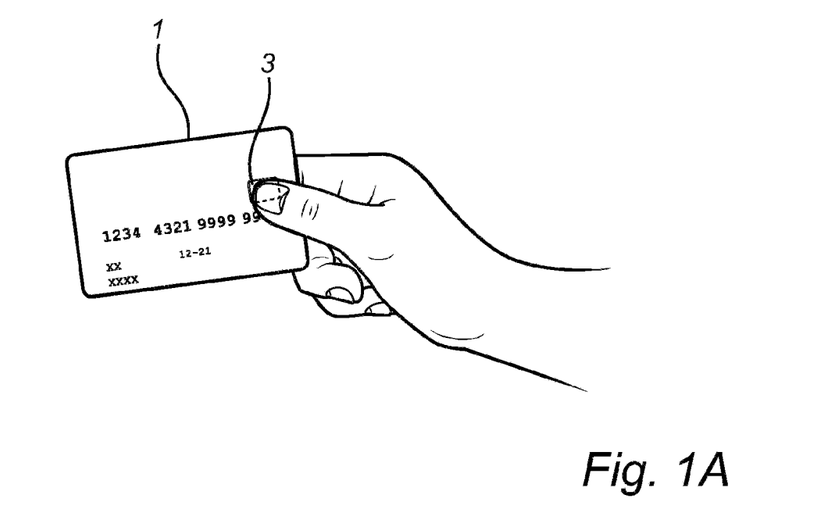
FIG. 1A is an illustration of an exemplary biometrically enabled contactless smartcard.

FIG. 1A schematically illustrates an exemplary contactless smartcard 1 including a biometric arrangement 3, here in the form of a fingerprint sensor module. The contactless smartcard 1 may, for example, be a biometrically enabled payment card, and payments may be authorized by biometrically authenticating the user, as is schematically indicated in FIG. 1A. Of course, a payment card such as that shown in FIG. 1A is not the only kind of biometrically enabled contactless smartcard for which embodiments of the present invention may be useful. Examples of other kinds of biometrically enabled contactless smartcards may include access cards, storage cards, identity cards, etc.

Figure 1B:
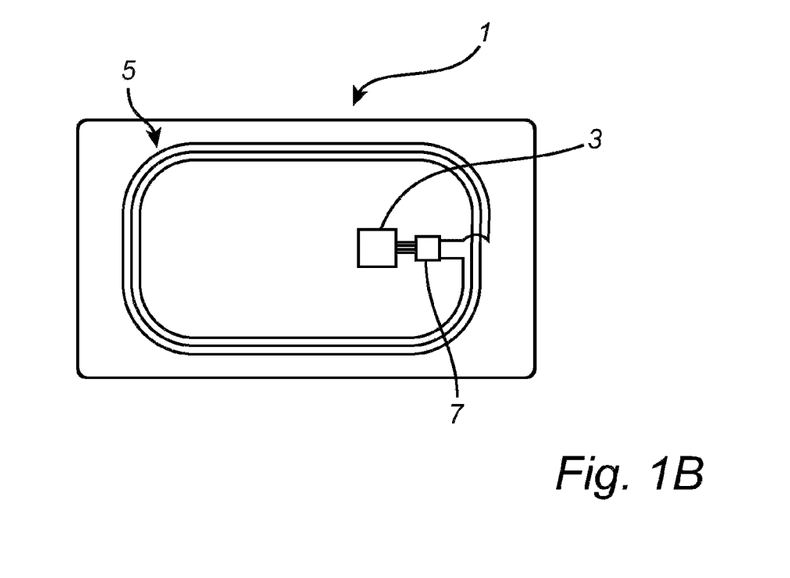
FIG. 1B is a schematic view of the smartcard in FIG. 1A, when delaminated to reveal functional parts of the smartcard.

As is schematically shown in FIG. 1B, the smartcard 1 additionally comprises a wireless power transfer arrangement 5, and, in this particular embodiment, a secure element 7. The wireless power transfer arrangement 5 may be used for harvesting electrical power from a time-varying electrical field, and for wirelessly communicating with a remote device, such as a card reader (not shown), typically through load modulation. The secure element 7 may, for example, contain information for authorizing a transaction, and is connected to the biometric arrangement 3. When the user is authenticated by the biometric arrangement 3 (or by the biometric arrangement 3 in co-operation with the secure element 7), the information contained in the secure element 7 may be unlocked and allowed to be wirelessly communicated to the remote device via the wireless power transfer arrangement 5.

Figure 2:
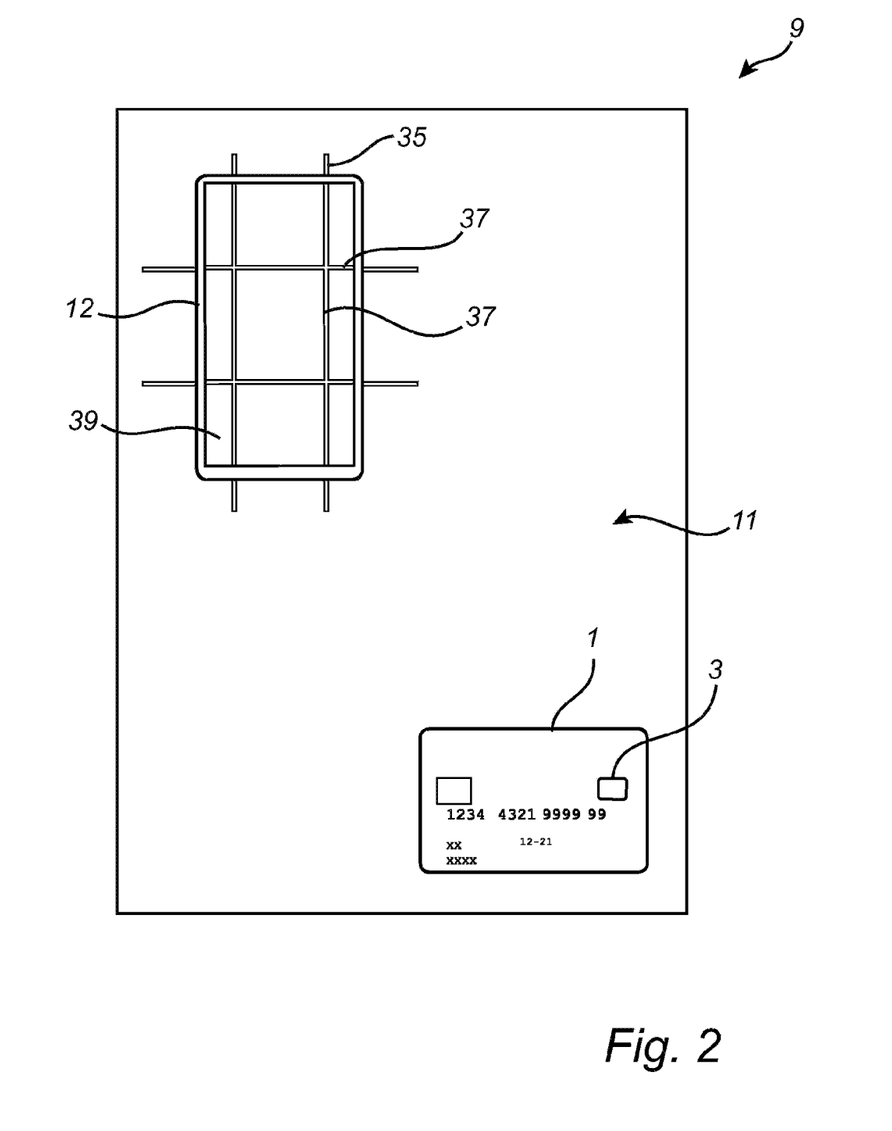
FIG. 2 is a schematic illustration of a biometric system, including an enrollment assistance device according to an example embodiment of the present invention, and the contactless smartcard in FIG. 1A arranged on a predefined second surface portion of the enrollment assistance device.

FIG. 2 is a schematic illustration of a biometric system 9, including an enrollment assistance device 11 according to an example embodiment of the present invention, and the contactless smartcard 1 in FIG. 1A arranged on, such as fixed on, a predefined second surface portion of the enrollment assistance device 11. In appearance, the biometric system 9 in FIG. 2 may be similar to the letter sent by an issuer of a smartcard to a user, but the enrollment assistance device 11 taking the place of an ordinary sheet of paper in such a letter can assist the user to effortlessly perform an biometric enrollment using the biometric arrangement 3 of the contactless smartcard 1. The contactless smartcard 1 may, for example, be fixed by a suitable adhesive, may be inserted in a sleeve comprised in the enrollment assistance device 11, or may be loosely arranged on the predefined second surface portion.

In FIG. 2, a user device 12 is indicated as being placed on a predefined location on the enrollment assistance device 11, for wirelessly powering the contactless smartcard 11 during the above-mentioned biometric enrollment.

Figure 3A:
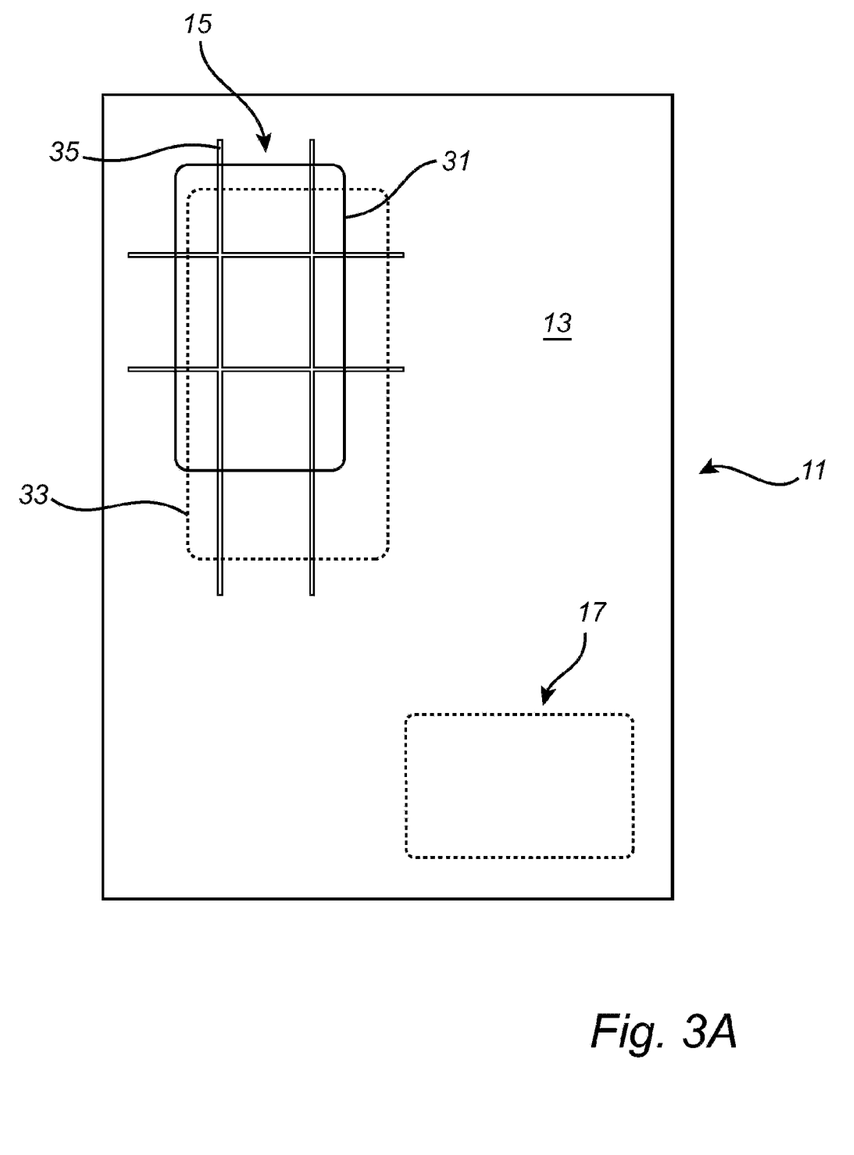
FIG. 3A is a frontside view of the enrollment assistance device in FIG. 2, without the contactless smartcard.
Figure 3B:
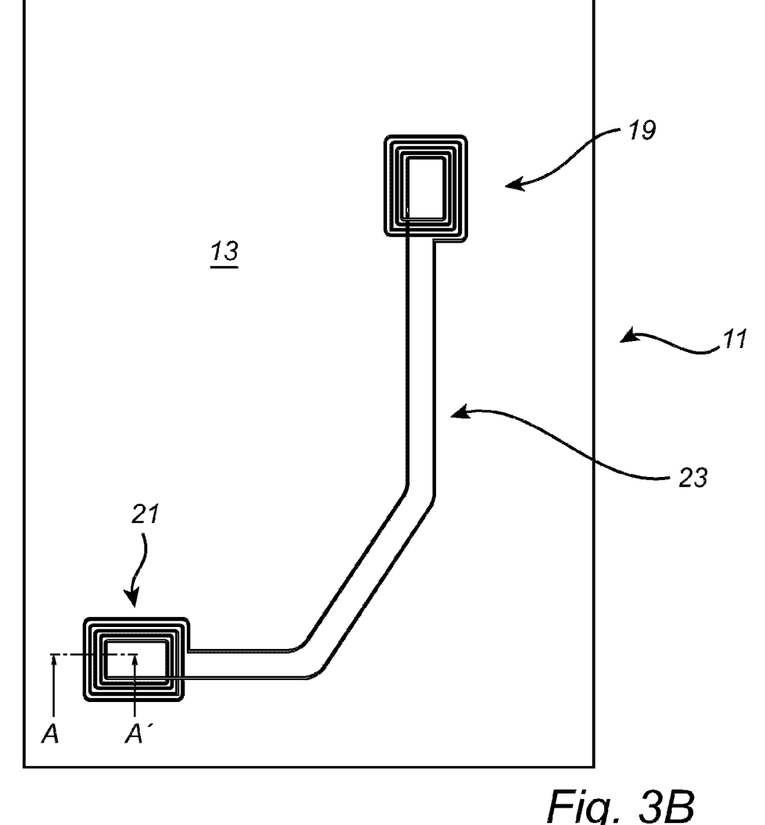
FIG. 3B is a backside view of the enrollment assistance device in FIG. 3A.

FIG. 3A is a frontside view, and FIG. 3B is a backside view of the enrollment assistance device 11 in FIG. 2. Referring first to FIG. 3A, the enrollment assistance device 11 comprises a carrier 13 having a first surface portion 15 and a second surface portion 17 spaced apart from the first surface portion 15. The first surface portion 15 is for arrangement of a user device, and the second surface portion 17 is for arrangement of a contactless smartcard.

Referring now to FIG. 3B, the enrollment assistance device 11 further comprises a first wireless power transfer arrangement 19, a second wireless power transfer arrangement 21, and a conductor arrangement 23 supported by the carrier 13 and conductively connecting the first wireless power transfer arrangement 19 and the second wireless power transfer arrangement 21.

The first wireless power transfer arrangement 19 is supported by the carrier 13 under the first surface portion 15, as seen from the front side of the enrollment assistance device 11 (FIG. 3A) so that a first wireless power transfer link can be formed with wireless power transfer arrangement of a user device (such as the mobile user device 12 in FIG. 2) when the user device is correctly arranged on the first surface portion 15 of the carrier 13. The second wireless power transfer arrangement 21 is supported by the carrier 13 under the second surface portion 17, as seen from the front side of the enrollment assistance device 11 (FIG. 3A) so that a second wireless power transfer link can be formed with wireless power transfer arrangement of a contactless smartcard (such as the contactless smartcard 1 in FIG. 2) when the contactless smartcard 1 is correctly arranged on the second surface portion 17 of the carrier 13.

The conductor arrangement 23 conductively connects the first wireless power transfer arrangement 19 and the second wireless power transfer arrangement 21 in such a way that power transfer is enabled from the user device 12 to the contactless smartcard 1, via the above-mentioned first wireless power transfer link, the conductor arrangement 23, and the above-mentioned second wireless power transfer link.

The carrier 13 may advantageously be cellulose-based, for minimum environmental impact, but could alternatively be made of a plastic material, which may be recycled and/or manufactured without the use of fossil material. The conductor pattern forming the first wireless power transfer arrangement 19, the second wireless power transfer arrangement 21, and the conductor arrangement 23 may be supported on the surface of carrier 13, on either the front side or the back side of the carrier 13. Alternatively, the conductor pattern may embedded in the carrier 13. For instance, the carrier 13 may be a multi-layer structure.

Figure 4A:
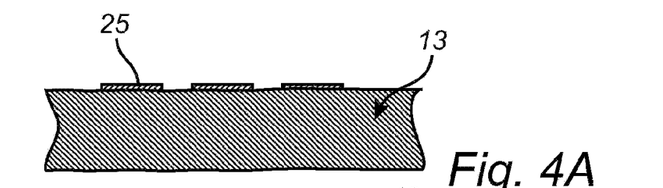
FIGS. 4A-B are schematic cross-section views of different example configurations of the enrollment assistance device 11 in FIGS. 3A-B.

FIG. 4A, which is a partial schematic cross-section view of the enrollment assistance device 11 at the section indicated by A-A' in FIG. 3B, illustrates a first example configuration in which the conductor 25 forming the above-mentioned conductor pattern is provided at the surface of the carrier 13. The conductor 25 may be printed using conductive ink using per se known techniques. Alternatively, the conductor 25 may be preformed on a sticker, which may be attached to the carrier 13.

Figure 4B:
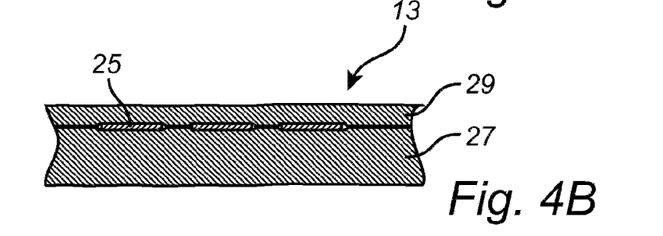

FIG. 4B illustrates a second example configuration in which the conductor 25 is embedded inside the carrier 13 through lamination between first 27 and second 29 sheets.

Due to the standardized form factor of contactless smartcards, achieving correct arrangement of the contactless smartcard 1 in relation to the second wireless power transfer arrangement 21 is relatively unproblematic. As mentioned further above, the contactless smartcard 1 may be pre-attached at the correct position in the second surface portion 17. To achieve correct arrangement of the user device 12 may be more challenging, since the configuration and arrangement of the wireless power transfer arrangement of the user device 12 may vary depending on model. For instance, again referring to FIG. 3A, one model of user device may form a reliable wireless power transfer link with the first wireless power transfer arrangement 19 of the enrollment assistance device 11 when placed as indicated by a first outline 31 in FIG. 3A, and another model of user device may need to be placed as indicated by a second outline 33 in FIG. 3A.

To facilitate correct placement of the user device 12, the carrier 13 may therefore be provided with at least one indicium for guiding the user to correctly arrange the user device 12 on the first portion of the carrier 15, in relation to the first wireless power transfer arrangement 19. The at least one indicium may, for instance, comprise a number of outlines 31, 33 as mentioned above, corresponding to the physical outlines of the most common user devices 12. Alternatively, or in combination, the at least one indicium may comprise a guiding pattern, such as the exemplary grid pattern 35 shown in FIG. 2 and FIG. 3A.

In the example embodiment of the enrollment assistance device 11 described above, the wireless power transfer arrangements 19, 21 have been illustrated as being configured for inductive power transfer. It should be noted that other forms of wireless power transfer, such as capacitive power transfer may alternatively be used. Furthermore, the user device 12 need not necessarily be a mobile phone or similar personal communication device. In embodiments, the enrollment assistance device 11 may be configured for use with, for example, a wireless charger or similar devices.

Figure 5:
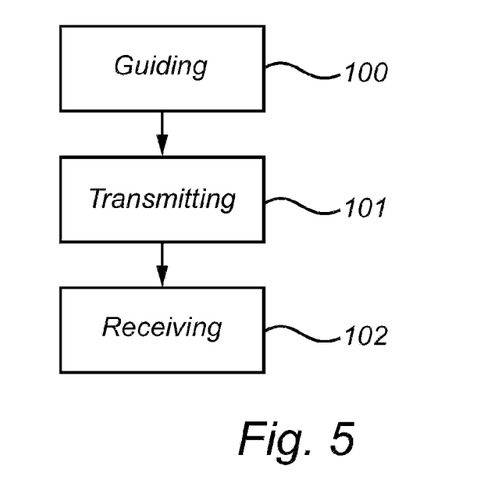
FIG. 5 is a flow-chart illustrating a method according to an example embodiment of the present invention.

A method according to an embodiment of the present invention will now be described with reference to the flow-chart in FIG. 5, and with additional reference to other figures as indicated. When the method is carried out, the user has a biometric system 9 such as that described above with reference to FIG. 2. The biometric system 9, including the enrollment assistance device 11 and the contactless smartcard 1 arranged on the second surface portion 17 of the carrier 13 may have been sent to the user by mail from the issuer of the card, such as a financial institution or the like. The user is also in possession of a mobile user device 12, such as a mobile phone or tablet, including a wireless power transfer arrangement arranged to provide an electric field for power transfer adjacent to a backside of the mobile user device, and a display arranged on a frontside of the mobile user device 12.

In a first step 100, the user is guided to arrange the mobile user device 12 on the first surface portion 15 of the carrier 13 of the enrollment assistance device 11 comprised in the biometric system 9, with the backside of the mobile user device 12 facing the first surface portion 15. The guiding is achieved by providing guidance to the user. Such guidance may, for example, be included in the biometric system 9 that is provided to the user. For instance, written and/or graphical guidance may be printed on the carrier. As was mentioned above, such graphical guidance may include outlines 31, 33 of popular mobile phones.

Figure 6:
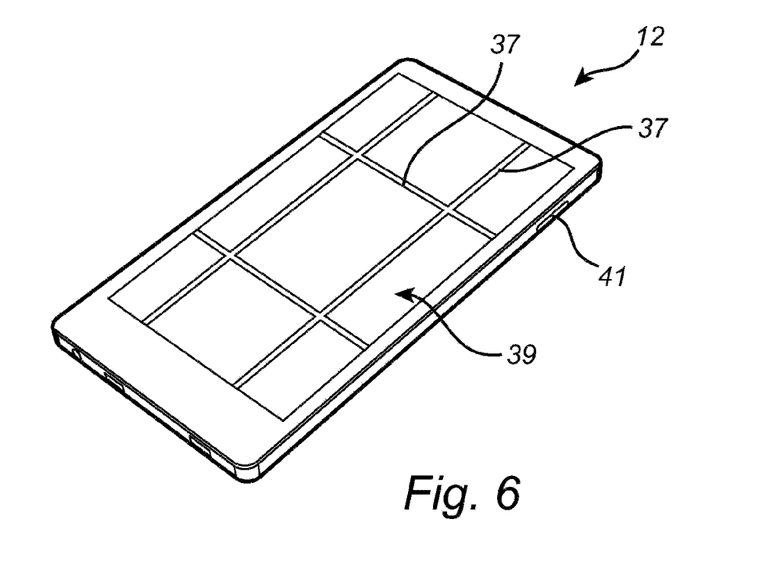
FIG. 6 is a schematic illustration of how the user can be guided to correctly arrange the user device in relation to the enrollment assistance device.

Alternatively, the user may be guided by controlling the mobile user device 12 to provide an alignment pattern 37 on the display 39 of the mobile user device 12 (referring to FIG. 2 and to the illustration of an exemplary mobile user device 12 in FIG. 6). The mobile user device 12 is controlled by software, for example an app that may be provided by the card issuer, to arrange the alignment pattern 37 on the display 39 in relation to the wireless power transfer arrangement of the mobile user device 12 and the at least one indicium (such as the grid pattern 35) on the carrier 13 to enable the user to align the wireless power transfer arrangement of the mobile user device 12 with the first wireless power transfer arrangement 19 of the enrollment assistance device 11 comprised in the biometric system 9, by aligning the alignment pattern 37 on the display with the at least one indicium 35 on the carrier 13.

In this example, the software running on the mobile user device 12 has been provided with the relevant positional relations between the at least one indicium 35 on the carrier 13, the wireless power transfer arrangement comprised in the mobile user device 12, and the configuration of the display 39 of the mobile user device 12.

In the subsequent step 101, the mobile user device 12 transmits, to the contactless smartcard 1 a signal encoding an instruction to the contactless smartcard 1 to start to perform biometric enrollment. The signal is sent wirelessly to the contactless smartcard 1, and may be sent via the enrollment assistance device 11 using per se known techniques for near field communication. Alternatively, this signal may be wirelessly transmitted using another wireless communication link, such as using low-power radio transmission.

During the enrollment procedure, the user may be guided by instructions and/or illustrations provided on the display 39 of the mobile user device 12. Such instructions and/or illustrations may be based on information provided wirelessly from the contactless smartcard 1 to the mobile user device 12. For instance, the user may be instructed in respect of finger placement and/or receive information about the status of the enrollment procedure.

When the enrollment procedure has been completed, as determined by the biometric arrangement 3 of the contactless smartcard 1, the mobile user device receives, in step 102, a signal indicating that the enrollment has been completed.

In embodiments, the ability to successfully finalize the enrollment and enable use of the biometric capabilities of the contactless smartcard 1 may be conditional on a user authentication performed using the mobile user device 12. This may particularly be the case for a so-called initial enrollment, where no biometric template is stored on the smartcard. In such embodiments, the mobile user device 12 may locally carry out the user authentication, for example using a fingerprint sensor 41 or other biometric arrangement comprised in the mobile user device 12. Alternatively, the mobile user device 12 may be used as an input device for input of a code, such as a password, PIN or OTP, for transmission to a remote server for authentication there.

In embodiments, the signal encoding a (correct) instruction to the contactless smartcard 1 to start to perform the enrollment may only be sent if a successful user authentication has first been performed. In other embodiments, the enrollment may be carried out, but the generated biometric template may be discarded, or the biometric capabilities of the smartcard 1 may be locked unless a successful user authentication is performed.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A biometric system comprising:
   a contactless smartcard including a biometric arrangement and a wireless power transfer arrangement; and
   an enrollment assistance device for power supply to the contactless smartcard allowing enrollment operation of the biometric arrangement, the enrollment assistance device comprising:
   a carrier having a first surface portion for arrangement of a user device including a wireless power transfer arrangement, and a second surface portion, spaced apart from the first surface portion, for arrangement of the contactless smartcard;
   a first wireless power transfer arrangement supported by the carrier and arranged to form a first wireless power transfer link with the wireless power transfer arrangement of the user device when the user device is arranged on the first surface portion of the carrier;
   a second wireless power transfer arrangement supported by the carrier and arranged to form a second wireless power transfer link with the wireless power transfer arrangement of the contactless smartcard when the contactless smartcard is arranged on the second surface portion of the carrier; and
   a conductor arrangement supported by the carrier and conductively connecting the first wireless power transfer arrangement and the second wireless power transfer arrangement, in such a way that power transfer is enabled from the user device to the contactless smartcard, via the first wireless power transfer link, the conductor arrangement, and the second wireless power transfer link,
   wherein the contactless smartcard is fixed by an adhesive on the second surface portion of the carrier of the enrollment assistance device.

2. The biometric system according to claim 1, wherein the carrier comprises at least one indicium in the form of a number of outlines of different user devices and/or a guiding pattern, for guiding the user to correctly arrange the user device on the first portion of the carrier, in relation to the first wireless power transfer arrangement.

3. The biometric system according to claim 1, wherein the carrier is provided in the form of a sheet.

4. The biometric system according to claim 1, wherein the carrier is cellulose-based.

5. The biometric system according to claim 1, wherein the first wireless power transfer arrangement, the second wireless power transfer arrangement, and the conductor arrangement are printed on the carrier.

6. The biometric system according to claim 1, wherein the first wireless power transfer arrangement and the second wireless power transfer arrangement are configured for inductive power transfer.

7. A method of enrolling a user, the method comprising:
guiding the user to arrange a mobile user device including a wireless power transfer arrangement arranged to provide an electric field for power transfer adjacent to a backside of the mobile user device on a first surface portion of a carrier of an enrollment assistance device, with the backside of the mobile user device facing the first surface portion;
transmitting, by the mobile user device, via a first wireless power transfer arrangement in the first surface portion of the carrier, a conductor arrangement supported by the carrier, and a second wireless power transfer arrangement in the second surface portion of the carrier, to a contactless smartcard arranged on the second surface portion of the carrier, a signal encoding an instruction to the contactless smartcard to start to perform biometric enrollment; and
receiving, by the mobile user device from the contactless smartcard arranged on the second surface portion of the carrier, after the biometric enrollment has been completed, a signal indicative thereof.

8. The method according to claim 7, wherein:
the signal encoding the instruction to the contactless smartcard to perform biometric enrollment is transmitted via the first wireless power transfer arrangement, the conductor arrangement, and the second wireless power transfer arrangement; and
the signal indicating that the enrollment has been completed is received via the first wireless power transfer arrangement, the conductor arrangement, and the second wireless power transfer arrangement.

9. The method according to claim 7, wherein:
the carrier of the enrollment assistance device comprises at least one indicium for guiding the user to correctly arrange the mobile user device on the first portion of the carrier, in relation to the first wireless power transfer arrangement; and
guiding the user comprises controlling the mobile user device to provide an alignment pattern on a display of the mobile user device, the alignment pattern being arranged on the display in relation to the wireless power transfer arrangement of the mobile user device and the at least one indicium on the carrier to enable the user to align the wireless power transfer arrangement of the mobile user device with the first wireless power transfer arrangement of the enrollment assistance device, by aligning the alignment pattern on the display with the at least one indicium on the carrier.

10. The method according to claim 9, wherein:
the method further comprises of receiving information indicative of a model of the mobile user device; and
the alignment pattern formed on the display depends on the received information.

11. The method according to claim 7, further comprising:
performing a user authentication using the mobile user device; and
allowing completion of the biometric enrollment only if the user authentication is successful.

* * * * *